I. S. ADLERBLUM.
YARDAGE CONTROLLING DEVICE FOR PIECES OF FABRIC.
APPLICATION FILED SEPT. 13, 1917.
1,273,123.
Patented July 23, 1918.
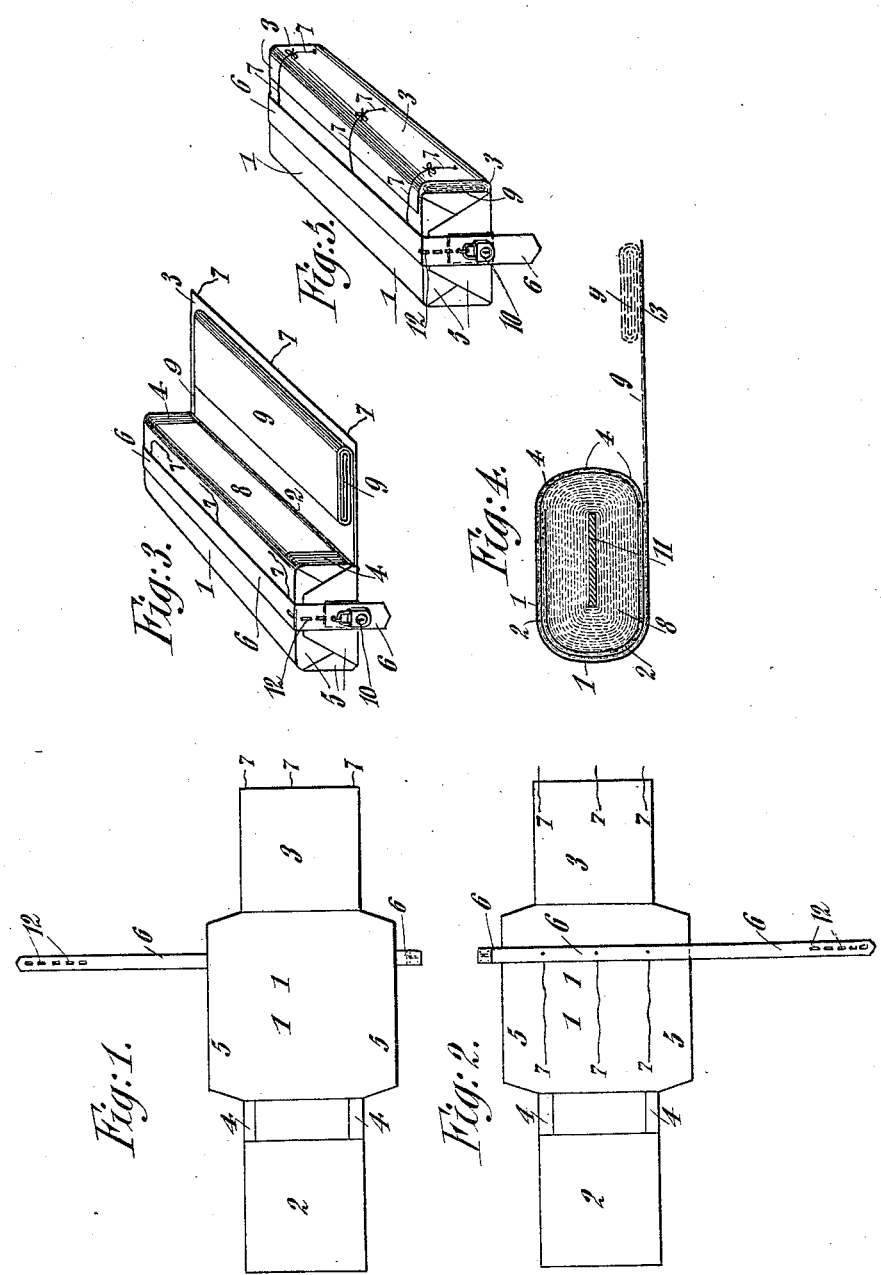
INVENTOR
Israel S. Adlerblum
BY Mock & Blum
ATTORNEYS.

UNITED STATES PATENT OFFICE.

ISRAEL S. ADLERBLUM, OF EDGEMERE, NEW YORK.

YARDAGE-CONTROLLING DEVICE FOR PIECES OF FABRIC.

1,273,123.  Specification of Letters Patent.  Patented July 23, 1918.

Application filed September 13, 1917. Serial No. 191,111.

*To all whom it may concern:*

Be it known that I, ISRAEL S. ADLERBLUM, a citizen of the United States, residing at Edgemere, in the county of Queens and State of New York, have invented certain new and useful Improvements in Yardage-Controlling Devices for Pieces of Fabric, of which the following is a specification.

The object of my invention is to construct a cheap and simple guard and protector for bolts and pieces of fabric such as cloths, silks, laces, and the like, whether such pieces are folded spirally or in layer form, which protector shall make it possible to check up and control the quantities of the materials used up in the making of a given order of garments or other articles, and thus prevent or minimize the dangers of pilfering, wastage, and recklessness in the using up of materials in the process of manufacture; and which also shall protect the bolt or piece of fabric against damage by air, dust, sunshine, etc.; and which further shall facilitate the taking of stock-inventory and the keeping of the said stock-inventory continuously up to date.

All concerns that manufacture garments or other articles that require the use of fabrics in their manufacture, find it necessary to keep in their stock-rooms many pieces or bolts of fabric which are often very expensive, such as laces, silks, velvets, cloths, and the like. When any order is to be made up, these bolts or pieces of fabric are handed to the cutters, who are supposed to use as much material as is necessary for the filling of the given order.

Experience has shown that enormous losses are sustained by the concerns, because of pilfering and recklessness on the part of cutters in the quantities of material they consume in cutting the garments, and also because of soiling and other injuries to the fabrics. Since a concern of any magnitude has on hand hundreds of bolts or pieces of fabric, each bolt or piece containing many yards, it is impracticable to check up the quantities of the materials used up by the cutters when they handle the bolts or pieces of fabric, by measuring the balance of the bolt or piece of goods they have returned. As a result, it is possible, and it frequently happens that some cutters pilfer several yards of silk or some other expensive fabric, and take it away with them when they leave the factory. In addition, knowing that there is no way of checking up the quantities they use in making up a given order, cutters often do not take pains to arrange their patterns in a manner to cut up the material economically, but instead they are often extravagant with the material and cut it up recklessly, thus consuming more material than is really necessary for filling the order. And although some concerns require their cutters to register on a stock-ticket attached to the bolt of cloth, the quantities they have taken from the bolt in cutting a given order, they have not had hitherto any practicable means of ascertaining whether the cutters are making truthful entries, and the result has been that cutters have often registered lesser quantities than they have actually used up. Furthermore, as the bolts or pieces of fabric are handled many times in the course of a day, they become soiled or affected by the sun, and the top windings become a total loss.

Although the above conditions, especially the continual loss by pilfering and recklessness on the part of employees, have been a recognized evil for many years, no successful device has as yet come on the market to solve the aforementioned difficulties. It is inadvisable to sever a limited portion of the material and hand it to the cutter, as it is not possible to readily predetermine the minimum yardage that would be required, especially if the order is for garments of odd sizes or for more than one garment at a time. In the last-mentioned instance it is nearly always a fact that it takes proportionately less material to make two or more garments of the same fabric at a time, than it takes to make only one. The cutter would therefore have to be handed the maximum amount of material he might have to use, and this would inevitably entail waste due to remnants remaining, which can hardly be used as severed pieces, but which, if allowed to remain continuous with and uncut from the body of the bolt of goods, can be profitably employed at a subsequent time when another garment has to be made from the same material. And it has been shown above that it is equally unprofitable to place the entire bolt of cloth in the hands of the cutters, because of the possibilities of pilfering and extravagance in the cutting up of the materials.

My invention provides a very simple, cheap and effective device which overcomes these difficulties. It can be readily made up by the manufacturers themselves. It minimizes theft and extravagance, makes possible the keeping of a stock-inventory continuously up to date, and also protects the goods from soiling or the like.

A preferred embodiment of my invention is shown in the following description and accompanying drawings, in which—

Figure 1 is a plan view of the inner side of my device;

Fig. 2 is a plan view of the outer side of my device;

Fig. 3 is a perspective view of my protector applied to a bolt of cloth from which a smaller portion has been unrolled;

Fig. 4 is a cross-section view of Fig. 3;

Fig. 5 is another view of Fig. 3, showing the protector enveloping both the main portion of the bolt and also the smaller unrolled portion.

I have employed identical numbers to designate corresponding parts in each figure.

Section 1 constitutes the body of the protector and covers the top, bottom and outer edge of the bolt or piece of cloth which is to be protected.

Section 2 is joined to section 1 by means of two or three bands, 4, and is adapted to be rolled up intermediate the two or three outer layers of the bolt of cloth.

Section 3 is a flap continuous with section 1, and serves to shield from dust and soiling the unrolled portion of the bolt of fabric, when the material is not in use.

Sections 5 are the end flaps continuous with or attached to the edges of the body 1, and shield from dust and soiling the ends of the bolt of cloth.

Section 6 is one or more straps of any suitable width and material having notches 12, and is attached across the length of body 1, so that the end-parts of the strap assume a perpendicular position relative to the said body 1, and the whole strap is adapted to encircle the bolt of cloth lengthwise. The strap is provided with coöperating locking parts, 10, which may be key controlled, or of any suitable variety which is not illustrated in my drawings, as my invention is not limited to this particular feature in itself.

Section 7 consists of a suitable number of pairs of strings attached respectively to sections 1 and 3, and serves to secure the said sections 1 and 3 together in a plurality of positions.

My protector can be made of any suitable fabric, and in any width desired.

To use my device, the bolt of cloth, 8, from which an order is to be cut and which is rolled or laid around the board 11, has unrolled therefrom any necessary length, 9, which will be sufficient to yield the number of garments required. It is easy to determine the approximate maximum length that will be needed, and this maximum is unrolled for the cutter's use. Then the main part of the bolt, 8, is further unrolled for two or three or more turns, and then rerolled this number of turns, the section 2 being rolled up intermediate the folds of the cloth of the bolt, so that, as shown in Fig. 4, the section 2 becomes irremovably secured to the bolt of cloth, with the length of cloth, 9, which is necessary for making up the given order, freed from the bolt.

Now the section 1 is folded around the outer layer of the bolt, the flaps, 5, are properly adjusted, and the strap 6 is turned around at right angles to section 1, thus encircling the bolt lengthwise, and is then locked together by means of the locking devices 10, as shown in Fig. 3. A metal buckle having a semi-circular tongue stamped out therefrom is secured to the short end of the strap 6. When the long end of the strap 6 encircles the bolt, this semi-circular tongue, as shown in Fig. 3, can be pushed through one of the notches or holes 12. The padlock is then secured in place, as shown in Fig. 3, and, since the semi-circular tongue of the buckle before mentioned is secured at both of its ends to the body of the buckle, the body of the bolt of cloth is securely locked. The key is retained by the foreman or the stock-clerk charged with the responsibility of the safe-keeping of the stock of materials, and the bolt, thus locked is turned over to the cutter.

It is now impossible for a cutter or designer to take any portion of the locked body of the bolt of cloth, as it is impossible to remove the section 2 or to slide off the straps 6, without unlocking the safety-lock 10, and the cutter has no key to it. The cutter can thus use up only the predetermined portion that has been released. Moreover, aware of the fact that his employer or authorized assistant is able to check up the quantity of the material that he has used up in cutting a given order, the cutter will of necessity be more cautious as to the manner in which he cuts up the material.

At the same time the bolt is also protected completely from sun, dust, etc., as the released portion which is not needed for immediate use may be protected by folding it up and covering it with the section 3, which is tied to section 1 by means of the strings, 7, as shown in Fig. 5. When this section 3 is fastened to the body 1, the inner edge of the bolt and the released portion are completely enveloped in a tight well-made packing, so that they can be handled or thrown about without injury to the fabric.

My device makes it also possible to keep an accurate and continuous stock-inventory, as it is a relatively easy matter to keep track of the yardage in any bolt or piece of fabric by a simple stock-ticket which can be attached to the bolt of fabric at the time of its purchase, and which can be kept up to date from time to time by proper entries of the yardages used up. It is very easy to measure the unused balance of the relatively short length that has been released from the body of the bolt remaining after the cutter has taken the requisite quantity of material from it. It is thus possible to have at any time an authentic record of the yardage contained in any bolt of cloth equipped with my protector, without resorting to the necessity of measuring it over and over again. The bolt of cloth is returned to the stock-clerk after the cutter or the designer has used it, and the stock-clerk can make the proper journal and ledger entries in the stock-books.

I have described a preferred embodiment of my invention, but it is clear that numerous changes and omissions can be made without departing from its spirit.

I claim:—

1. A guard for bolts of cloth comprising a body section, means for securing it to the inner edge of a partially unrolled bolt of cloth, so that the rolled-off portion of said bolt of cloth is free from said guard, and a strap section provided with locking means connected to said body section, and adapted to encircle the said bolt lengthwise.

2. A guard for bolts of cloth comprising a body section, a strap section extending perpendicular to said body portion, the length of the portion of said body section extending in front of said strap section being sufficient to enable the said front portion to be coiled intermediate a sufficient number of the outermost layers of said bolt of cloth to prevent the removal thereof, said strap section being provided with locking means and being adapted to encircle said bolt of cloth lengthwise.

3. In combination, a partially unrolled bolt of cloth, a guard having a body section rolled transversely around the inner edge of the rolled part of the said bolt of cloth intermediate a sufficient number of the windings of the said rolled portion to prevent the removal thereof, a strap section connected to said body section at right angles thereto and of sufficient length to encircle the said rolled portion lengthwise, and key-controlled locking means on said strap for preventing the removal thereof.

4. In combination, a partially unrolled bolt of cloth, a guard having a body section rolled transversely around the inner edge of the rolled part of said bolt of cloth intermediate a sufficient number of the windings of the said rolled portion to prevent the removal thereof, a strap section connected to said body at right angles thereto and of sufficient length to encircle the said rolled portion lengthwise, and locking means on said strap section, said body section having a flap section posterior to said strap section and of sufficient length to be folded transversely around the adjacent part of the rolled portion of the bolt of cloth to overlap the inner edge of the rolled-off portion of the said bolt of cloth.

5. In combination, a partially unrolled bolt of cloth, a guard having a body section rolled transversely around the inner edge of the rolled part of the said bolt of cloth intermediate a sufficient number of the windings of the said rolled portion to prevent the removal thereof, a strap section connected to said body section at right angles thereto and of sufficient length to encircle the said rolled portion lengthwise, and locking means on said strap section, said body section having a flap section posterior to said strap and of sufficient length to be folded transversely around the adjacent part of the rolled portion of the bolt of cloth to overlap the inner edge of the rolled-off portion, and coöperating fastening means on said flap section and said body section whereby the rolled-off portion of said bolt of cloth can be tightly secured to the rolled portion of the said bolt of cloth.

In testimony whereof I hereunto affix my signature.

ISRAEL S. ADLERBLUM.

Copies of this patent may be obtained for five cents each, by addressing the "Commissioner of Patents Washington, D. C."